July 26, 1938.  H. N. HALVERSEN  2,125,017
GLASSWORKING MACHINE
Filed June 28, 1935  8 Sheets-Sheet 1

INVENTOR
HANS N. HALVERSEN, DECEASED
BY, TRADESMENS BANK AND TRUST COMPANY, ADMR.
BY
Charles B. Belknap
ATTORNEY

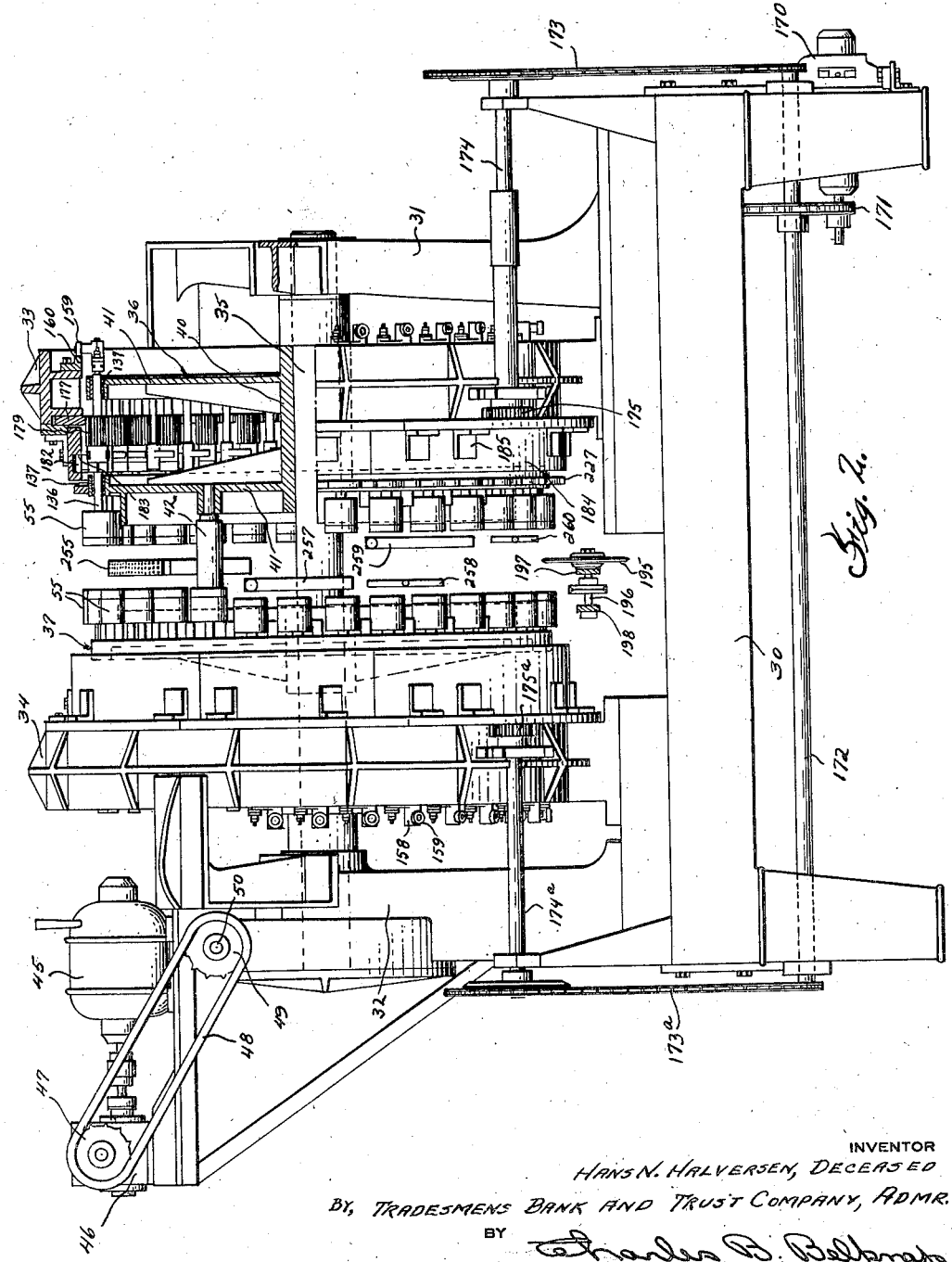

July 26, 1938.  H. N. HALVERSEN  2,125,017
GLASSWORKING MACHINE
Filed June 28, 1935  8 Sheets-Sheet 3

INVENTOR
HANS N. HALVERSEN, DECEASED
BY, TRADESMENS BANK AND TRUST COMPANY, ADMR.
BY
ATTORNEY

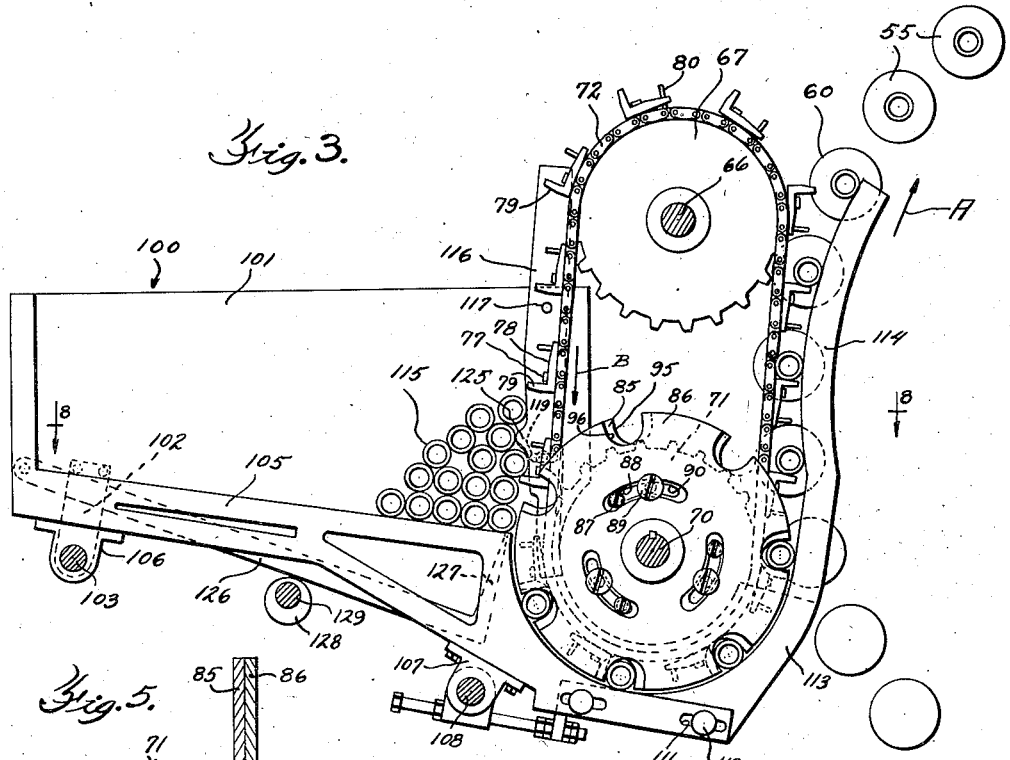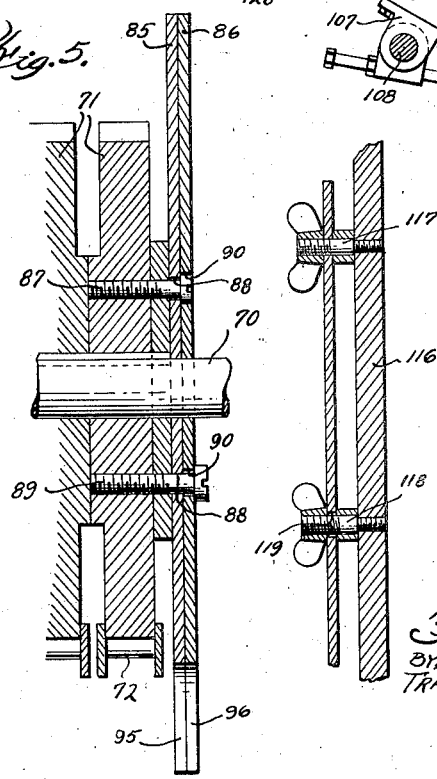
July 26, 1938. H. N. HALVERSEN 2,125,017
GLASSWORKING MACHINE
Filed June 28, 1935 8 Sheets-Sheet 4
Inventor
HANS N. HALVERSEN, DECEASED
BY
TRADESMENS BANK AND TRUST COMPANY, ADMR.
By Charles B. Bellamy
Attorney

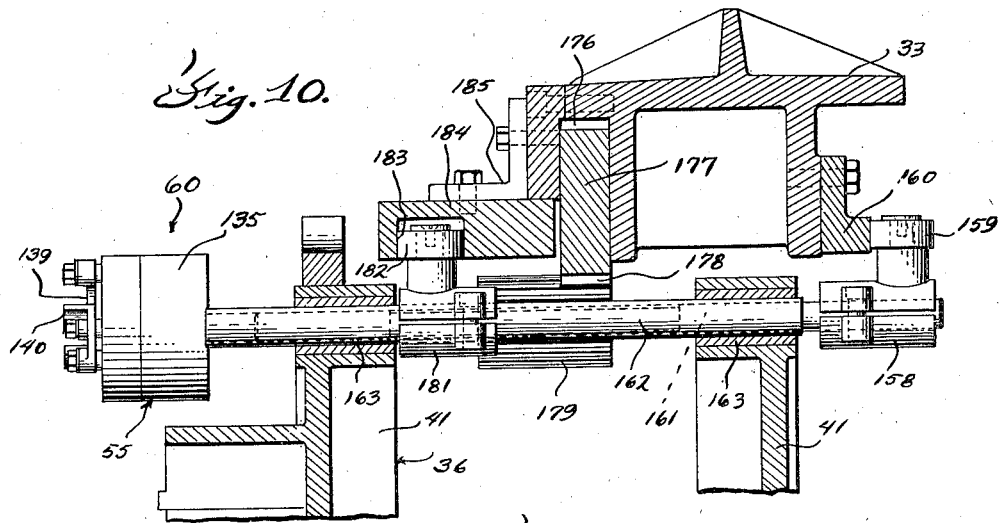
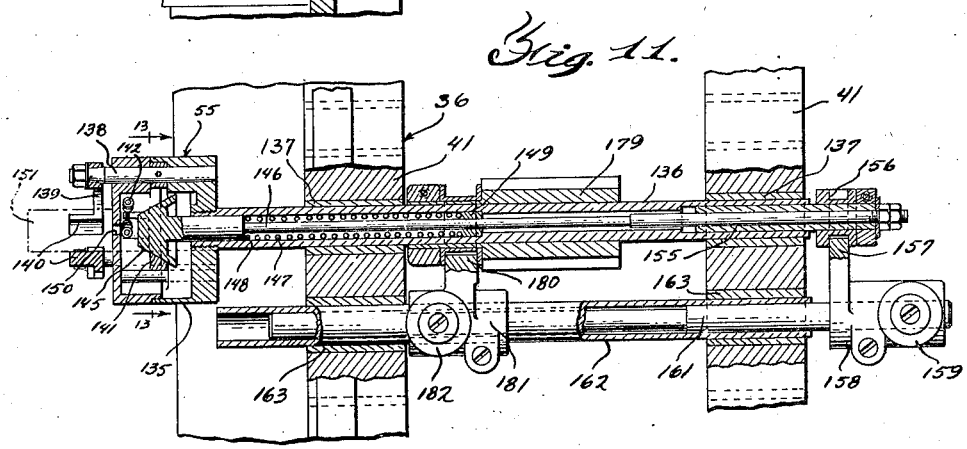
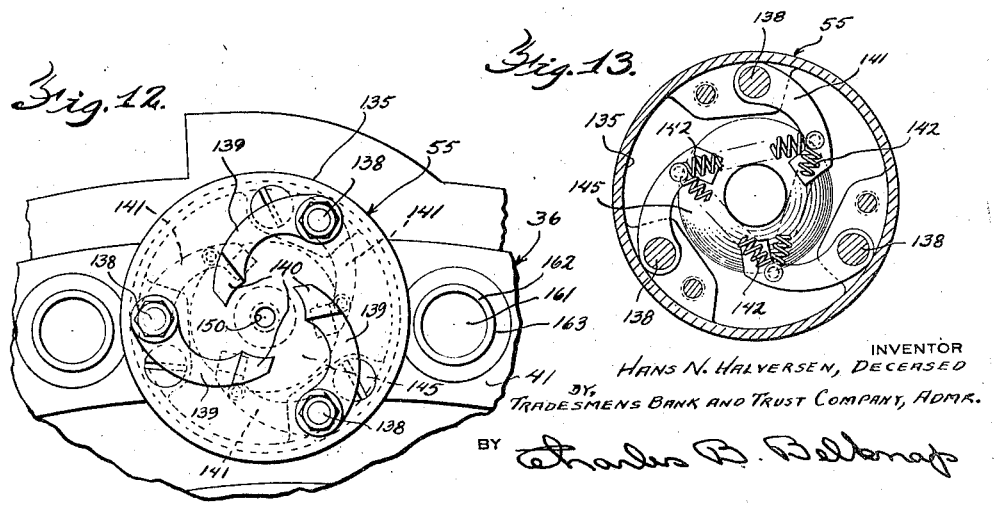

July 26, 1938.   H. N. HALVERSEN   2,125,017
GLASSWORKING MACHINE
Filed June 28, 1935   8 Sheets-Sheet 7

INVENTOR
HANS N. HALVERSEN, DECEASED
BY, TRADESMENS BANK AND TRUST COMPANY, ADMR.
BY  Charles B. Belknap
ATTORNEY July 26, 1938.   H. N. HALVERSEN   2,125,017
GLASSWORKING MACHINE
Filed June 28, 1935   8 Sheets-Sheet 8
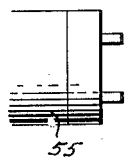
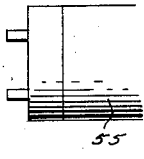
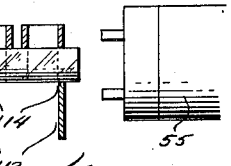
Fig. 18.   Fig. 19.
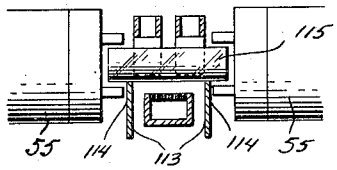
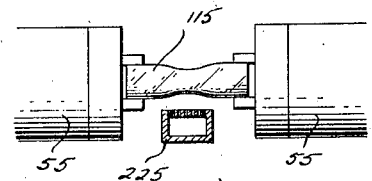
Fig. 20.   Fig. 21.
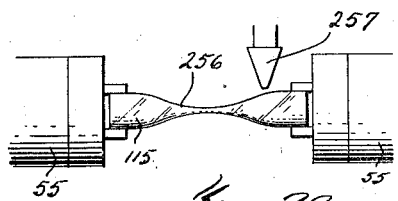
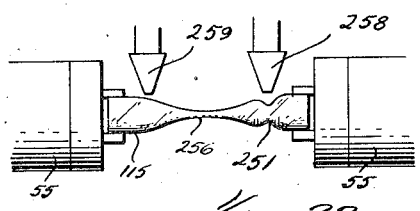
Fig. 22.   Fig. 23.
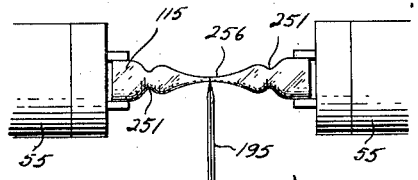
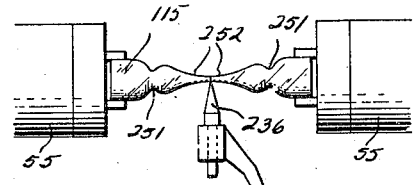
Fig. 24.   Fig. 25.
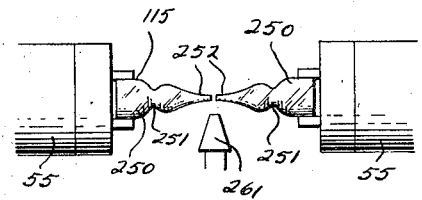
Fig. 26.
INVENTOR
HANS N. HALVERSEN, DECEASED
BY, TRADESMENS BANK AND TRUST COMPANY, ADMR.
BY
ATTORNEY Patented July 26, 1938

2,125,017

UNITED STATES PATENT OFFICE 2,125,017

GLASSWORKING MACHINE

Hans N. Halversen, deceased, late of Vineland, N. J., by Tradesmens Bank and Trust Company, administrator, Vineland, N. J., assignor to Kimble Glass Company, Vineland, N. J., a corporation of Illinois Application June 28, 1935, Serial No. 29,510

19 Claims. (Cl. 49—7)

This invention relates to glass working machines and has particular reference to a machine adapted to produce changes in the shape of glass tubes or like bodies.

While the machine may be conveniently used for the forming of ampoules and will be so described, it will be apparent that the machine may be utilized for forming various types of bodies from glass tubes or the like.

One of the primary objects of this invention is to provide an improved feeding means for feeding blanks to a machine of the above mentioned character.

A further object of the invention is to provide improved chucks for gripping the blanks during the forming operations.

The invention contemplates further the provision of means for heating the blanks and for so rotating the chucks that the blanks will be rotated and evenly heated by the heating means.

The invention provides means whereby a plurality of constrictions or the like may be formed at spaced points through the length of a glass tube and provides further improved means for severing the glass tube into a plurality of sections after the forming operations are completed.

The above are merely a few of the numerous objects of this invention which will become more apparent as the following description proceeds particularly when reference is had to the accompanying drawings wherein:

Fig. 2 is a rear elevational view partly in section of the machine shown in Fig. 1;

Fig. 3 is a fragmentary side elevational view of the feeding mechanism;

Fig. 5 is a fragmentary detail sectional view of a portion of the mechanism shown in Fig. 3;

Fig. 6 is a fragmentary elevational view of the chain structure forming a part of the feeding mechanism;

Fig. 7 is a sectional view taken substantially on the line 7—7 of Fig. 6;

Fig. 9 is a detail sectional view through a part of the magazine forming a part of the feeding mechanism;

Fig. 10 is a fragmentary sectional view showing the chuck actuating and driving means;

Fig. 11 is a sectional view showing further details of the chuck structure and the actuating means therefor;

Fig. 12 is a front elevational view of one of the chucks;

Fig. 13 is a sectional view taken substantially on the line 13—13 of Fig. 11;

Figs. 18 to 26 inclusive are diagrammatic views illustrative of the operation of the machine on a glass blank.

General structure of the machine

Figure 1:
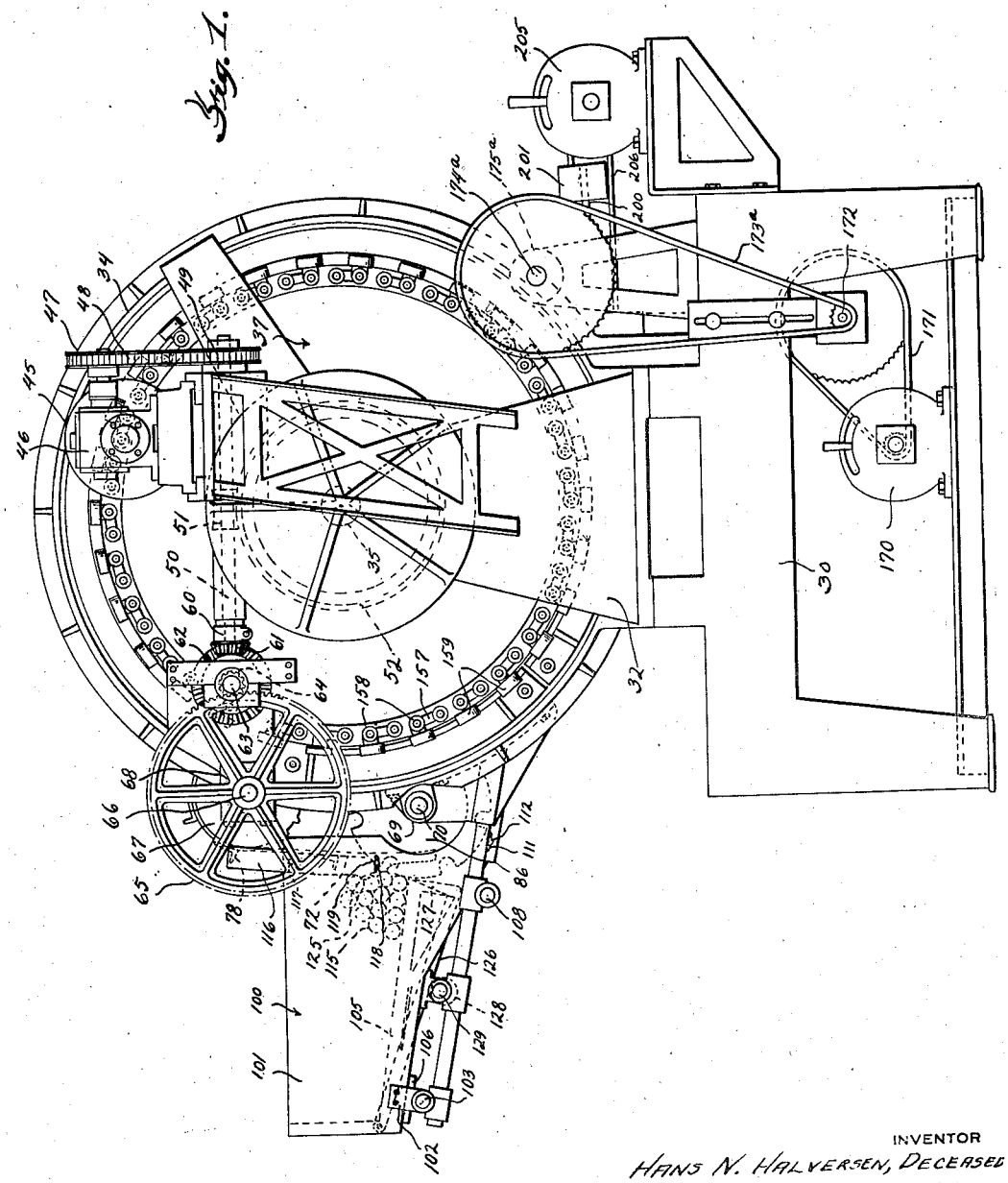
Fig. 1 is a side elevational view of a machine constructed in accordance with the teachings of this invention.

The invention is illustrated as being embodied in a machine of the type shown in Patent Number 1,621,359 issued to John T. Fagan et al. on March 15, 1927. The machine is illustrated in the drawings wherein like reference characters designate corresponding parts throughout all views, as comprising a base 30 which carries the upwardly extending bearing standards 31 and 32. Likewise carried by the base and projecting upwardly therefrom are circular housings 33 and 34. These housings are disposed between the bearing standards but are spaced apart as clearly illustrated in Fig. 2 of the drawings. Journalled in the standards 31 and 32 and projecting through the housings 33 and 34 is a shaft 35 to which are secured chuck carrying drums 36 and 37. The drum 36 is disposed within the housing 33 while the drum 37 is spaced from the drum 36 and is disposed within the housing 34 it being understood that upon rotation of the shaft 35 the drums are rotated within their respective housings.

Figure 17:
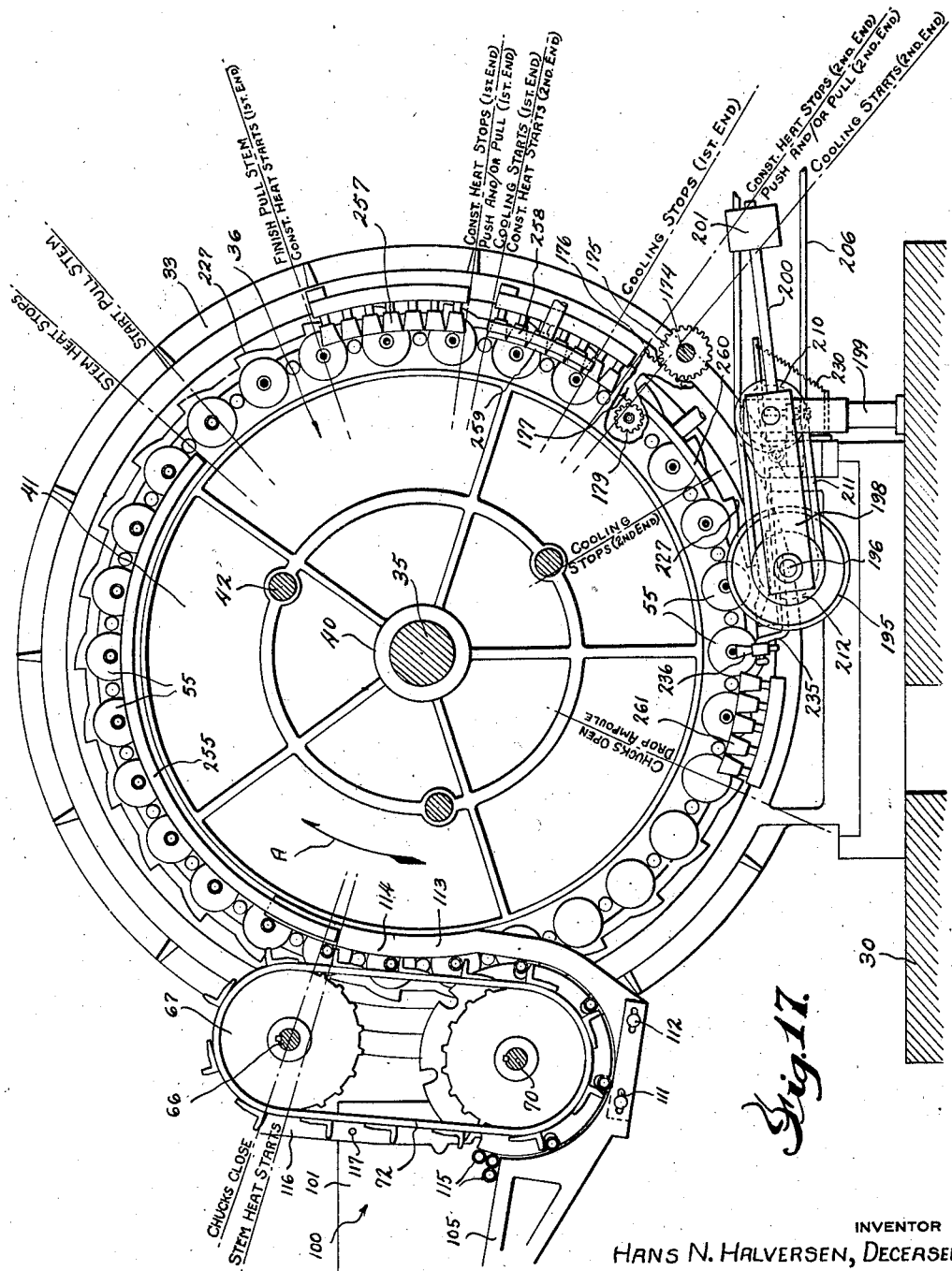
Fig. 17 is a semi-diagrammatic vertical sectional view through the machine indicating the several operations performed by the machine on a glass blank.

The drums are similar in construction and therefore only drum 36 is illustrated in detail in Fig. 2 of the drawings. By reference to this figure it will be noted that the drum comprises a hub 40 which is suitably fixed to the shaft 35 and spaced disklike members 41 projecting radially from the hub. The drums 36 and 37 are preferably secured together by tie members 42 as illustrated in Figures 2 and 17 of the drawings.

For rotating the shaft 35, there is provided a variable speed motor 45 which through reduction gearing 46 drives a sprocket 47. This sprocket drives a chain 48 which in turn drives a sprocket 49 fixed to a shaft 50 which is disposed at one side of the machine. The shaft 50 carries a worm 51 which engages a worm wheel 52 on the shaft 35 for rotating the latter. The drums carry chucks 55, these chucks being mounted for rotation and for axial movement as will hereinafter be more fully described. There are a series of chucks on each drum and the chucks of one drum are aligned with the corresponding chucks of the other drum to the end that each pair of chucks may grip opposite ends of a blank to be shaped such for example, as a length of glass tubing.

Blank feeding mechanism

In the operation of the machine it will be understood that lengths of glass tubing are fed to the chucks and are carried in a circular path by rotation of the drums 36 and 37. In the machine disclosed in Patent Number 1,621,359, the lengths of glass tubing were fed into alignment with the chucks by virtue of notched disks disposed between the rotating drums. These disks limited the area of the glass tubes that might be heated and further made it substantially impossible to form but a single constriction centrally of each glass tube.

The present invention contemplates the provision of feeding means disposed to one side or in front of the machine to the end that the space between the drums will be clear with the result that glass tubes held by the chucks may be heated at any point throughout their lengths. The feeding mechanism is shown more particularly in Figures 3 to 9 inclusive, but reference should be made first to Figure 1 wherein the drive for the feeding means is illustrated.

Figure 4:
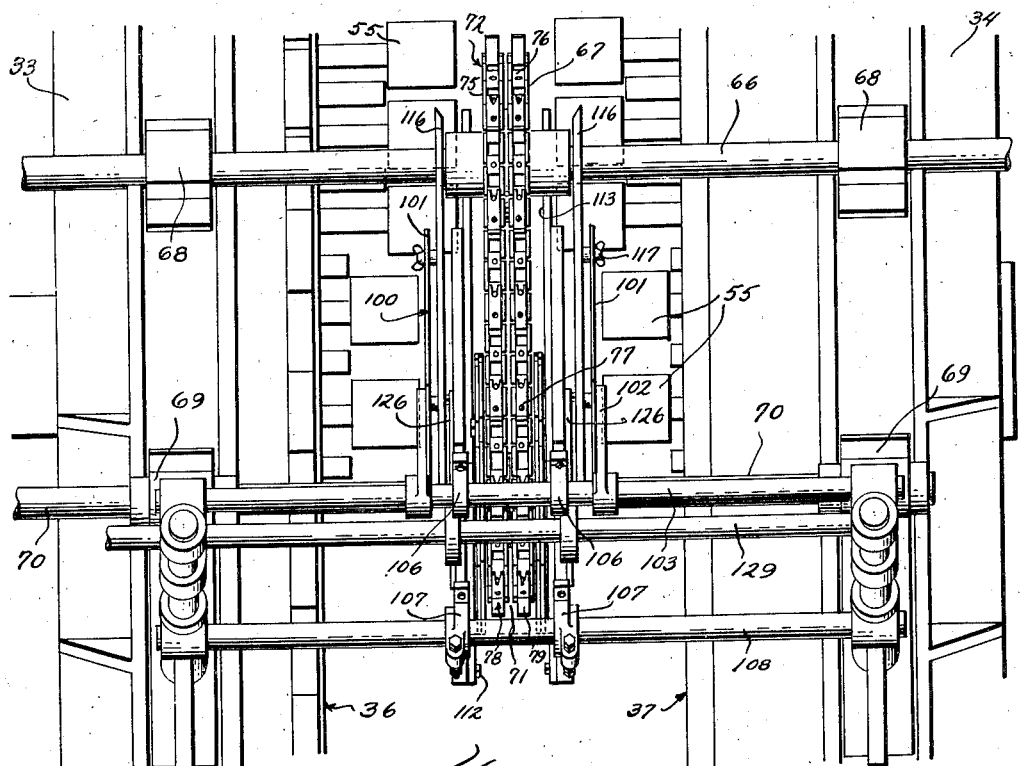
Fig. 4 is a fragmentary front elevational view of the feeding mechanism.
Figure 8:
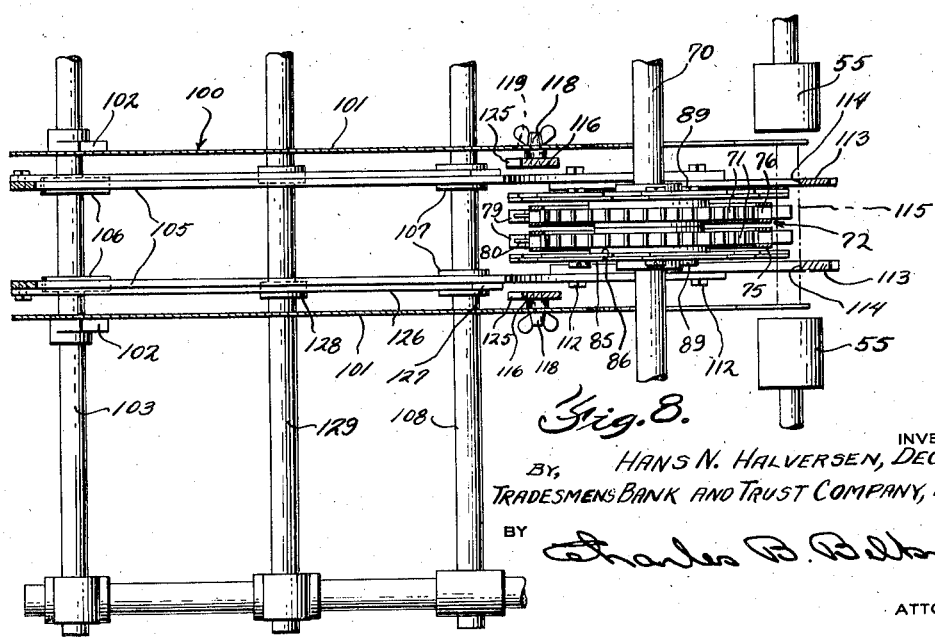
Fig. 8 is a horizontal view taken substantially on the line 8—8 of Fig. 3.

It will be noted that the shaft 50 is extended beyond the worm 51 and that adjustably secured to the end of this shaft as by the clamping collar 60 is a bevel gear 61 which engages a bevel gear 62 on a shaft 63. The shaft 63 carries a pinion 64 which engages a gear 65 fixed to one end of a shaft 66. This shaft extends across the front of the machine as illustrated in Figure 4 of the drawings and carries intermediate its ends sprocket wheels 67. There are two sprocket wheels provided, these being spaced however, closely together and being disposed in alignment with the center of the space between the drums 36 and 37.

The shaft 66 is journalled in suitable bearings 68 carried by the housings 33 and 34 and journalled in similar bearings 69 carried by these housings is a shaft 70. This shaft is spaced a substantial distance below the shaft 66 and carries the sprockets 71, there being two of these sprockets which are in alignment with the sprockets 67. Conveyor chains 72 are trained over the sprockets 67 and 71 and are driven by the sprockets 67 as will be clearly apparent.

As illustrated in Figures 6 and 7 of the drawings, each sprocket chain comprises links 75 pivotally secured to spaced blocks 76. Secured to every third block as by a screw 77 is an angle lug 78, the portions 79 of which are adapted to engage the glass blanks as will later be described. The next succeeding chain block 76 carries a pin 80 which projects through a slot 81 formed in the adjacent lug with the result that the lugs may not turn about the screws 77 but are allowed clearance for slight rocking movement as the conveyor chains turn about the sprocket wheels.

For the purpose of taking the glass tube blanks from the magazine, which will later be described, and locating the blanks properly with reference to the lugs on the conveyor chains 72, notched disks 85 and 86 are mounted on the lower sprocket shaft 70. Two of these disks are associated with each lower sprocket wheel 71 and the method of adjustably attaching these disks to their respective sprocket wheels is illustrated in Figures 3 and 5 of the drawings.

Thus, for example, to the outer face of a sprocket wheel 71 disk 85 is secured by bolts 87. These bolts pass through relatively narrow arcuate slots 88 formed in the disk 85 whereby the disk 85 may be adjusted rotatively with reference to its respective sprocket wheel 71.

Disk 86 is adjustably secured to the outer face of its respective disk 85 by bolts 89. These bolts pass through the slots 88 in the disk 85 and also through arcuate slots 90 in the outer disk 86, the heads of these bolts engaging the outer face of the disk 86 to clamp the same in position as will be apparent.

The arcuate slots 90 permit rotative adjustment of disk 86 with reference to disk 85 by loosening of bolts 89. Further, the slots 90 are relatively wide as compared to the slots 88 and as compared also to the heads of the bolts 87, with the result that the heads of bolts 87 may move in the slots 90 as clearly illustrated in Figure 5 of the drawings.

The disks 85 are notched as at 95, while the disks 86 are notched as at 96. The notches 95 and 96 are adapted to receive the glass tube blanks and the sizes of these notches may be adjusted to adapt the disks to the feeding of tubing of different diameters. Thus only one piece of tubing may be received in the aligned notches at a time.

The glass tube blanks are fed to the disks 85 and 86 from a magazine 100. This magazine comprises side plates 101 carried by brackets 102 mounted for longitudinal movement on a supporting rod 103 which extends across the front of the machine. The adjustment of the brackets 102 longitudinally of shaft 103 provides that the side plates may be spaced apart a distance equal to the lengths of the pieces of glass tubing being processed.

The floor of the magazine is formed of bars 105 supported in spaced relation to each other by brackets 106 carried by the shaft 103 and adapted for adjustment longitudinally thereof whereby the bars may be moved toward and away from each other. The inner ends of the bars are supported by brackets 107 carried by a shaft 108 which extends across the front of the machine in parallel relation with respect to the shaft 103.

The inner ends of the bars 105 are arcuate shaped to extend around the lower side of sprockets 71. Adjustably secured to the free inner ends of the bars 105 as by slots 111 formed in these bars and bolts 112, are guide arms or rails 113 which extend upwardly in the rear of the sprockets 67 and 71. These guide rails have portions 114 so shaped as to parallel the path of travel of the chucks 60. The adjustable connection of the guide rails 113 to the bars 105 provide for the proper spacing of these guide rails from the conveyor chain to adapt the feeding mechanism to tubes of different diameter.

The glass tube blanks 115 are stacked in the magazine as clearly illustrated in Figure 3 of the drawings and by virtue of the downward inclination of the bottom rails 105 these blanks are fed toward the conveyor chains and the feed disks. For the purpose of preventing the lugs on the conveyor chains from breaking the blanks, guard rails 116 are provided. Each guard rail is pivotally secured to its adjacent side plate 101 by a bolt 117. To provide for adjustment of the lower ends of the guide rails toward and away from the path of travel of the conveyor chains, the lower end of each guard rail is secured to its adjacent face plate by a bolt 118 which passes through an arcuate slot 119 in the guide plate. It will thus be apparent that the guard rails may be pivotally adjusted about the upper securing bolts 117.

The feeding mechanism operates as follows. The drums rotate in such a direction that the chucks are caused to travel in the direction of the arrow A in Figure 3 of the drawings. The sprockets 67 are rotated so as to cause the conveyor chains to travel in the direction of the arrow B in Figure 3 of the drawings.

With the tube blanks in the magazine, it will be apparent that as the disks 85 and 86 are rotated, one blank at a time will be picked up by the aligned notches 95 and 96 and carried around in these notches, being confined therein by the portions of the bottom rails 105 and the guard rails 113 which lie close adjacent the periphery of the lower sprockets 71.

As the glass tube blanks are carried upwardly by the notched disks, they are engaged by the portions 79 of the lugs 78 and are carried upwardly by the conveyor chains along a path determined by the guide rails 113 and more particularly by the portions 114 thereof. As previously mentioned, the portions 114 of these guard rails parallel the path of travel of the chucks 60 so that the tube blanks are caused to travel along a path which lies between and parallels the path of travel of the chucks. With the jaws of the chucks open as will be later described, the chucks are moved inwardly and caused to grip the ends of the tube blanks before the blanks have passed beyond the guide rails 114. As previously mentioned, the notched disks may be adjusted for tubes of different diameter by adjusting one notched disk with reference to the other. The lugs on the conveyor chains may be properly timed with the chucks on the rotating drums by adjustment of the bevel gear 61 with reference to the shaft 50, this adjustment being afforded by the adjustable collar 60. The notches may be adjusted with reference to the lugs on the conveyor chains by virtue of the bolts 87 which pass through arcuate slots in the disks 85. Thus it will be apparent that glass tubes picked up by the notched disks will be properly located with reference to the lugs on the conveyor chains and will be carried by these lugs into proper position to be gripped by the chucks on the rotating drums.

It might be noted that the guard rails 116 are preferably provided with cams 125 to prevent bridge building of the glass tube blanks. Further, there is provided means operable to prevent feeding of the blanks from the magazine, this means comprising arms 126 pivotally secured to the outer ends of the bottom rails 105. The inner ends of arms 126 are provided with upward projections 127 which when the arms 126 are rocked upwardly pass between the tube blanks and the notched disks thus preventing feeding of the blanks to the disks. Cams 128 fixed to a shaft 129 adapted to be rocked by a suitable lever (not shown) are provided for rocking the arms 126 upwardly.

*The chucks and the actuating means therefor*

As previously mentioned, the drums 36 and 37, each carry a series of chucks. The invention provides means for opening and closing the jaws of the chucks together with means for moving the chucks toward and away from each other to the end that they may grip the length of tubing to be shaped and may impart the proper forces to the length of tubing to properly shape the same. Since the chucks are all of like construction, one only will be described in detail.

Referring then more particularly to Figures 10 to 13 inclusive, the chuck is shown as comprising a housing 135 fixed as by threading to one end of a tubular stem 136. This stem is mounted for rotative and reciprocatory movement in bearings 137 formed in the disks 41 of the drum.

Journalled in the housing 135 and projecting through the forward face thereof are three shafts 138 these shafts being spaced circumferentially of the housing as clearly ilustrated in Figure 12 of the drawings. Frictionally secured to the projecting ends of these shafts are jaws 139 having free end portions 140 shaped to properly grip a glass tube blank.

Secured to the shafts 138 within the housing 60 are arms 141 and these arms are normally urged toward each other by springs 142 secured to the arms adjacent the free ends thereof. Each arm 141 is oppositely disposed with reference to its respective jaw member 139 whereby as the arms are pulled toward each other by the springs 142 the jaws are moved away from each other or out of gripping position.

For the purpose of forcing the arms 141 away from each other against the force exerted by springs 142 there is provided a frustro conical member 145 carried on the end of a rod 146 which extends through the tubular stem 136. A spring 147 disposed within stem 136 and surrounding rod 146 engages a shoulder 148 on the stem 146 and engages at its other end a collar 149 carried by the tubular stem 136. Thus this spring tends to force the frustro conical head 145 forwardly so that the gripping jaws are resiliently urged toward their gripping position.

Since the jaws are frictionally secured to the shafts 138, it is desirable to provide some means for centerng these jaws with reference to the axis of the housing 135. For this purpose the outer face of the housing is provided with an opening 150 adapted to receive a pin 151 shown in dotted lines in Figure 11 of the drawings. It is contemplated that in adjusting the jaws the pin will be secured in position and the jaws forced to their gripping position into firm engagement with the pin.

For actuating the chuck jaws, that is to open the same during a portion of the rotation of the drums 36 and 37, means is provided for moving the stem 146 to the right as viewed in Figures 10 and 11 of the drawings. As illustrated, the rod 146 is extended beyond the tubular stem 136 and has secured to its end a sleeve 155. Clamped on the sleeve is a collar 156 grooved to receive a yoke 157.

The yoke 157 is carried by a sleeve 158 and rotatably carried by this sleeve is a roller 159. This roller projects radially outwardly from the drum and is arranged to engage a cam 160 which is secured to the cylindrical housing in which the drum is located. The cam 160 is so constructed that during a predetermined portion of the rotation of the drum the sleeve 158 and thus the yoke 157 is moved to the right as viewed in Figures 10 and 11 to thus withdraw the frustro conical head 145 from between the arms 141 permitting these arms to be drawn together by the springs 142 which effects an opening of the jaws 139. It will be apparent that the cam 160 may be so arranged that the gripping jaws of the chuck will be opened at any desired point or points during the rotation of the drums.

For the purpose of guiding and supporting the sleeve 158, this sleeve is secured to one end of a guide rod 161. This rod is mounted for longitudinal sliding movement in a tubular member 162 and this member is in turn mounted for longitudinal sliding movement in bearings 163 formed in the disks 41. It will be noted from Figure 11 of the drawings that the tube 162 extends parallel with and closely adjacent the tubular stem 136.

As previously mentioned, the invention provides means for rotating the chuck and it is a feature of this invention that the chuck may be rotated at a speed which is independent of the speed of rotation of the drum on which the chuck is mounted. Referring now to Figures 1 and 2 of the drawings, it will be noted that there is provided a variable speed motor 170. By means of a chain 171 and suitable sprocket wheels this motor drives a shaft 172 which extends underneath the base 30 from one side of the machine to the other. Driven from the shaft 172 by means of a chain 173 and suitable sprocket wheels is a shaft 174 which carries at its end a pinion 175 arranged to engage teeth 176 formed on the outer periphery of a ring gear 177 which is journalled in the housing 33. It will be noted by reference to Figure 2 of the drawings that the other end of shaft 172 drives through a similar chain 173ª and a shaft 174ª a pinion 175ª which is arranged to drive a ring gear in the housing 34, this ring gear being identical with the ring gear 177 but not being shown in the drawings.

The ring gear is provided on its inner periphery with teeth 178 arranged to engage pinions 179 secured to the stems 136 of the chucks. It will be apparent that with the structure illustrated, the ring gears 177 may be rotated at any speed independent of the speed of rotation of the drums 36 and 37 and that since these ring gears rotatively drive the chucks, the chucks may be rotatively driven at any desired speed. This feature is of importance for the reason that by properly rotating the chucks and the tube blanks held thereby, the glass tubes may be evenly heated by the burners which will be later described, and the heated glass will distribute itself uniformly. Further, the speed of rotation may be controlled in dependence upon the diameter and wall thickness of the tube blanks being processed.

It also constitutes a feature of this invention to provide means for reciprocating the chucks 60, that is for moving aligned chucks toward and away from each other. To accomplish this result there is provided a yoke 180 which rotatively embraces a reduced portion of gear 179. This yoke is carried by a sleeve 181 which is secured to the tubular member 162, this tubular member being mounted for reciprocation in the bearings 163, as previously mentioned. Sleeve 181 carries a cam roller 182 which is arranged to travel in a cam groove 183 formed in an annular member 184 secured to the housing 36 as by the angle plates 185. It will be understood that the chucks carried by drum 37 are also arranged to be reciprocated by a similar cam associated with the cylindrical housing 34.

To briefly outline the operation of the chucks, it will be apparent that as the drums carrying the chucks are rotated, the chucks will be moved in a circular path about the shaft 35. During any desired portion of their travel the chuck jaws may be opened by retracting the head 145, this being effected by suitably designing cam 160. When however, head 145 is not retracted by cam 160, the head is resiliently urged forwardly by its spring 147 thus resiliently forcing the arms 141 apart and moving the jaws to their clamping position.

Additionally, at any time during the rotation of the drums, the chucks may be moved toward or away from each other depending entirely upon the cam groove 183. Thus one or more constrictions may be drawn in the glass tubes and additionally the shoulders adjacent the constrictions may be rounded, if desired, by forcing the chucks slightly toward each other immediately after the drawing operation. Thus the invention provides means whereby practically any desired pushing or pulling of the glass tube in the direction of its length may be effected during the travel of the glass tube in its circular path about the axis of the rotating drums.

The severing means

It is contemplated by this invention that the glass tube processed will be cut into a plurality of lengths before it is discharged from the machine. While in the embodiment of the invention illustrated, means is provided for severing the glass tube only into two sections, it will be apparent that if desired, the tube might be divided into more than two sections upon the completion of the processing operations.

To effect this severing operation, there is first provided a revolving steel disk 195 which is arranged to either score the glass tube or to cut entirely through the same. As illustrated in Figures 2 and 17, this disk is preferably located adjacent the base of the machine so that the tubes are cut after they have made almost a complete travel around the shaft 35. It is obvious however that the disk might be located at any desired point to effect the severing action wherever desired.

The disk is counterbalanced to regulate the pressure at which it engages the blanks and for this purpose the shaft 196 which carries the disk is journalled adjacent the ends of arms 197 and 198, these arms being pivotally secured to the upper ends of standards 199 carried by the base 30. Fixed to the arm 198 and projecting beyond the standards 199 is an arm 200 which carries a counterweight 201. This counterweight is mounted in any desired manner for adjustment longitudinally of the arm 200 so that the pressure with which the disk engages the glass blanks may be regulated.

The disk 195 is rotatably driven by the following structure from a variable speed motor 205 shown in Figure 1 of the drawings. The motor 205 drives a belt 206 which engages a pully 207 rotatably mounted on the shaft 208 which forms the pivots for the arms 197 and 198. Fixed to the pulley 207 for rotation therewith is a second pulley 210 and this pulley is connected by a belt 211 with a pulley 212 fixed to the shaft 196. It will be obvious that by mounting the pulleys 207 and 210 on the axis about which the arms 197 and 198 rock, the disk may be conveniently driven despite the rocking movement thereof.

If the disk is arranged to only score the glass tube blank or if for any reason, such as insufficient pressure, the parting of the blank is not effected by the rotating disk, this parting or severing of the blank is positively effected by the provision of a member arranged to strike the glass blank at the scored part thereof.

Figure 15:
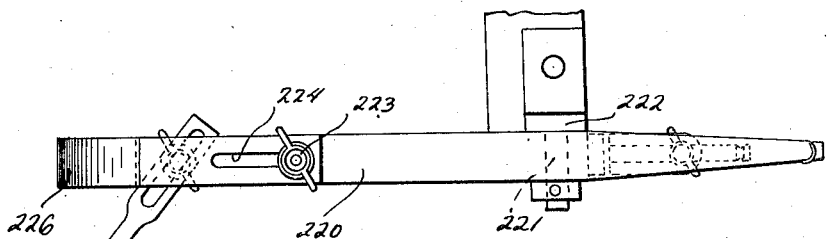
Fig. 15 is a plan view of the means for completing the severing operation.
Figure 14:
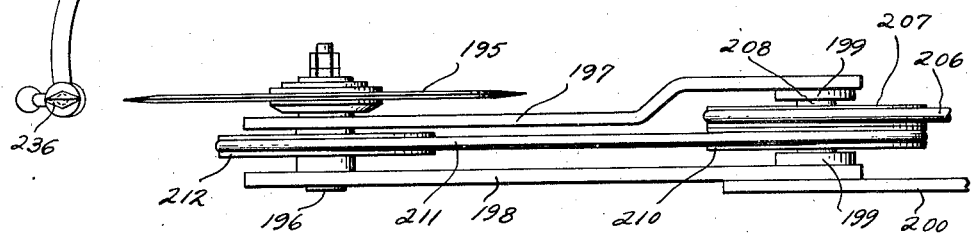
Fig. 14 is a detail plan view of a part of the means for severing the formed tube into a plurality of sections.
Figure 16:
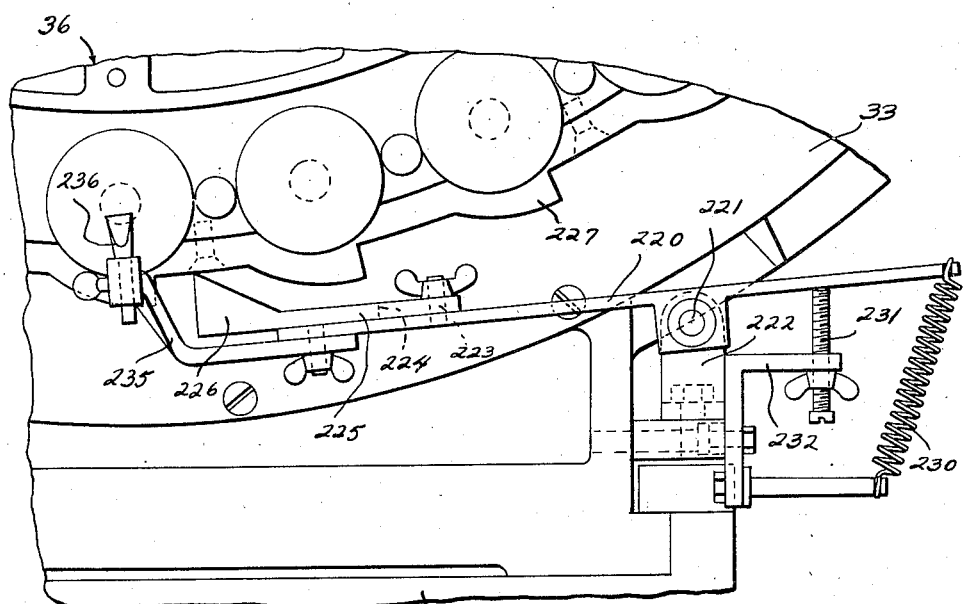
Fig. 16 is a side elevational view of the structure shown in Fig. 15.

The structure for accomplishing this is illustrated in Figures 15 and 16 as comprising an arm 220 pivotally mounted intermediate its ends as at 221 on a standard 222 supported on the base 30. Adjustably secured to one end of the arm as by the bolt and slot connection 223 and 224, is a member 225 having an inclined end portion 226 arranged to engage cams 227 formed at spaced points on one of the rotating drums. As illustrated in Figure 2 of the drawings, these cams are preferably formed on the periphery of the rotating drum 36.

A spring 230 secured to the other end of arm 220 tends to rock the arm about its pivot to cause the head 226 to engage the cams 227. Rocking movement of the arm is adjustably limited by a bolt 231 carried by a bracket 232 which is secured to the standard 222.

Adjustably secured to the arm 220 and projecting laterally therefrom is an arm 235 and adjustably secured to the free end of this arm is a member 236 which constitutes the striker or bumper. It will be noted by reference particularly to Figure 16 that when the head 226 rides off of one of the cams 227, the arm 220 is rocked to a position where the member 236 strikes the glass tube blank.

To briefly review the operation of the severing mechanism, it will be understood that at a desired point during the travel of the glass tube blanks, these blanks are engaged by the rotating sharpened disk 195. This disk may either score the blanks or may be arranged to cut through the blanks depending entirely upon the pressure exerted by the disk on the blanks. After a blank has been subjected to the action of the rotating disk, it is carried by the rotation of the chuck carrying drums to a position where it is struck by the member 236, this member being oscillated by virtue of cams formed on one of the rotating drums. Obviously, the striking of the scored blank by the member 236 will sever the blank at the scored portion so that the blank will be positively divided into sections.

*Operation*

The operation of the machine is diagrammatically illustrated in Figures 17 to 26 inclusive. Before however proceeding with a description of the operation of the machine, it might be noted that while a glass tube blank is being moved through the circular path by the rotation of the chuck carrying drums, it is subjected during periods of its travel to the heat of flames issuing from burners disposed between the rotating drums. These burners are in accordance with the usual practice adjustably mounted with the result that while one particular method of operating the machine will be described in detail, it should be borne in mind that by properly adjusting the burners and the cams which actuate the chucks, numerous shaping operations other than those described, may be effected by the machine.

For the purpose of illustration, the operation of the machine incident to the production of ampoules will be described. Two of these ampoules are shown in Fig. 26 of the drawings, each ampoule being designated by the reference character 250. It will be noted that each ampoule has intermediate its ends a constriction 251 and that further each ampoule terminates at one end in a stem 252 of reduced diameter.

As the drums 36 and 37 rotate, they carry with them the chucks 55. As the chucks approach the feeding mechanism, the jaws of the chucks are opened by virtue of cams 160, while the chucks are retracted by virtue of cams 184.

Consider now that a plurality of glass tubes 115 are placed in the hopper 100. It will be understood that the glass tube blanks are continuously fed one at a time from the magazine to the chucks carried by the rotating drums, but to simplify the description, the progress of one tube only will be described.

This tube will be picked up by one pair of the aligned notches in disks 85 and 86 and carried by the rotation of these disks to a position where it will be picked up by one pair of lugs 76. The tube will be moved by the lugs along a path determined by the portions 114 of the guide rails 113. Thus during a portion of its travel the tube will follow the path of travel of the pair of chucks which are adapted to grip this tube.

As the tube comes into alignment with the pair of chucks, the chucks are moved inwardly by the rollers 182 engaging the cam groove 183 and the chuck jaws are permitted to close by virtue of the fact that rollers 159 ride off the cams 160. This is illustrated in Figure 20 of the drawings wherein it will be noted that the chuck jaws are about to grip the ends of the blank to be processed.

With the ends of the tube gripped by the chucks, the tube is carried around and subjected intermediate its ends to flames issuing from an elongated arcuate shaped burner 255.

The chucks will be rotated at a desired speed independent of the speed of rotation of the chuck carrying drums by virtue of the ring gears 177 with the result that the intermediate portion of the tube being processed will be evenly heated and the heated glass will distribute itself uniformly about the longitudinal axis of the blank. After the intermediate portion of the blank has been heated sufficiently, the chucks are moved away from each other by the rollers 182 in cam grooves 183 to form a portion 256 of reduced diameter in the tube. The portion of the rotation of the drum during which this pulling of the stem occurs is diagrammatically illustrated in Figure 17 of the drawings.

The next step is to form the constriction 251 in the ampoule and to accomplish this the glass tube blank adjacent one end thereof is subjected to the sharp flames issuing from suitably located burners 257. While the force of the flames issuing from these burners may be and frequently is sufficient to form a constriction of the desired size, various lengths of constrictions and various forms of shoulders adjacent these constrictions may be suitably formed by moving the chucks toward and away from each other after the blank has been suitably heated by the flames from the burners 257.

As diagrammatically illustrated in Fig. 17, after the one end of the blank has been subjected to a constricting heat for a suitable period, the chucks may be moved apart or pushed together to properly shape the constriction after which the constriction thus formed may be subjected to jets of cooling air issuing from nozzles 258 this being diagrammatically illustrated in Figure 23 of the drawings. Preferably, at the same time the other end of the blank may be subjected to sharp flames issuing from burners 259, this heating being continued sufficiently long to either form the desired constriction in the blank adjacent the other end thereof, or to heat this portion of the blank sufficiently to permit the forming of a desired constriction by properly moving the chucks toward or away from each other. This second end of the blank is then cooled by suitable air jets from nozzles 260, the blank at this time being shaped as illustrated in Figure 24 of the drawings.

The blank is now carried by the rotation of the drums to a position to be acted on by the rotating disk 195 and as previously mentioned, this disk either severs the blank into two sections or scores the blank so that it may then be positively severed by the action of the striker 236. The action of the rotating disk and of the striker is illustrated diagrammatically in Figures 24 and 25 of the drawings.

After the blank has been divided into two sections, the adjacent ends of the sections are preferably subjected to glazing fires issuing from burners 261, the location of these burners being diagrammatically illustrated in Figure 17 of the drawings. Upon completion of the glazing operation the chuck jaws are opened and the finished ampoules dropped onto a discharge chute or endless conveyor (not shown). Obviously the empty pair of chucks continues its travel to the feeding mechanism where a new blank is fed to this pair of chucks.

It will be understood that the drums continuously rotate and that each pair of chucks carry a tube blank with the result that ampoules are being continuously formed during operation of the machine. Further, since the burners may be changed or adjusted in various ways, and since the movement of the chucks toward and away from each other may be properly controlled by properly designing the cam grooves 183, it will be apparent that the glass bodies may be shaped in practically any way desired, and that the constrictions formed therein may be located at any desired points throughout the lengths of the tube blanks.

Thus the machine is adapted for the production of ampoules or the like differing substantially in shape.

From the above it will be apparent that the invention provides an improved feeding means disposed substantially tangent to the path of travel of chucks adapted to grip the blanks to be processed. The feeding means leaves the space between the chucks or rotating drums substantially clear with the result that the burners may be located wherever desired to heat the glass tube blanks at any desired points.

Further, the invention provides improved chucks together with means for opening and closing the jaws of these chucks, means for controlling the movement of these chucks toward and away from each other and means for rotating these chucks at any desired speed independent of the speed of rotation of the drums which carry the chucks.

The invention provides a means for positively severing the processed blanks into two or more sections and means for glazing the severed ends of the sections so that the processed articles will be discharged from the machine ready for use.

While the invention has been described with some detail, it is to be understood that the description is for the purpose of illustration only and is not definitive of the limits of the inventive idea. The right is reserved to make such changes in the details of construction and arrangement of parts as will fall within the purview of the attached claims.

What is claimed is:

1. In a machine of the class described, a pair of aligned chucks adapted to grip the ends of a tube, means for moving said chucks along a definite path, a magazine for holding tubes to be fed to the chucks, a conveyor for moving the tubes from the magazine into alignment with the pair of chucks, and means independent of the chucks for moving the tubes in a path coincident with a substantial portion of said definite path and for maintaining the tubes moved by said conveyor in alignment with the chucks during a portion of the travel of the chucks.

2. In a machine of the class described, a pair of rotating drums, a series of pairs of aligned chucks carried by said drums, a tube magazine spaced from said drums, a conveyor adapted to receive tubes from said magazine, said conveyor having a portion projecting between said drums whereby the tubes carried by the conveyor will be disposed between the chucks carried by the drums, and means associated with said conveyor and separate from the chucks for maintaining the tubes carried thereby in alignment with the chucks during a portion of the travel of the chucks incident to rotation of the drums, said members including a guide element concentric with said drums.

3. In a machine of the class described, a pair of aligned chucks adapted to grip the ends of a glass tube, a pair of drums carrying said chucks, a pair of rails disposed between said drums defining a path parallel with the path of movement of the chucks, and a conveyor adapted to convey a glass tube from a point remote from said drums onto the rails whereby the tube will be brought into alignment with the pair of chucks.

4. In a machine of the class described, a pair of rotating drums, a series of pairs of aligned chucks carried by said drums, a magazine, a conveyor for transporting tubes from said magazine into alignment with the chucks carried by said drums, and means including a notched disk for feeding tubes from said magazine to said conveyor.

5. In a machine of the class described, a pair of rotating drums, a series of pairs of aligned chucks carried by said drums, a magazine, a conveyor for transporting tubes from said magazine into alignment with the chucks carried by said drums, a pair of disks having aligned notches for feeding glass tubes from said magazine to the conveyor, and means providing for adjustment of said disks relative to each other to adapt the same to the feeding of tubes of different diameters.

6. In a machine of the class described, a pair of rotating drums, a series of pairs of aligned chucks carried by said drums, a conveyor disposed adjacent one side of said drums and having a portion disposed between the drums in substantial alignment with the chucks, means for feeding glass tubes to said conveyor, and rails associated with said conveyor and disposed between said drums for guiding the tubes carried by said conveyor into alignment with the chucks carried by the drums.

7. In a machine of the class described, a means for holding a glass tube, means for moving said holding means along a definite path, and means independent of said moving means for rotating said holding means, said rotating means being controllable to vary the speed thereof independently of the speed of movement of the holding means along said path.

8. In a machine of the class described, a pair of cylindrical housings, a drum rotatably mounted within each housing, means for rotating said drums, a series of pairs of aligned chucks rotatably carried by said drums, a gear mounted on each of said chucks, ring gears rotatably carried by said cylindrical housings and engaging the gears on said chucks, and means independent of said rotating means for variably driving said ring gears independently of the speed of rotation of said drums.

9. In a machine of the class described, means for holding a glass tube, means for moving said holding means along a definite path, and means for dividing the glass tube into a plurality of sections, said last mentioned means including a rotating disk, means for rotating said disk, and adjustable counterbalancing means to continuously urge said disk into engagement with the tube carried by said holding means.

10. In a machine of the class described, a pair of rotatable drums, means for rotating said drums, a series of pairs of aligned chucks rotatably carried by said drums, the chucks of each pair being adapted to grip the ends of a glass tube, and means for severing each glass tube carried by a pair of chucks into two sections, said last mentioned means including a member mounted for oscillation and arranged to strike the glass tube, and means including cams carried by one of said drums for oscillating said member.

11. In a glass working machine, means for holding a glass blank, means for moving said holding means along a definite path, and means for feeding a blank to said holding means including mechanism arranged to receive a blank at a point remote from the path of movement of the holding means, to carry the blank into alignment with the holding means, and guide means adapted to maintain the blank in alignment with the holding means during a portion of the travel of the latter.

12. In a glass working machine, means for holding a glass blank, means for moving said holding means along a definite path, and means for feeding a blank to said holding means including an endless conveyor arranged to move a glass blank from a point remote from the path of travel of the holding means into alignment with the said holding means.

13. In a machine of the class described, a pair of aligned chucks adapted to grip the ends of a glass blank, a pair of drums carrying said chucks, guide means disposed between said drums defining a path parallel with the path of movement of the chucks, and a conveyor adapted to convey a glass blank from a point remote from said drums into engagement with the said means whereby the blank will be brought into alignment with the pair of chucks.

14. In a machine of the class described, means for holding a glass blank, and means for feeding a blank to said holding means including a conveyor, a magazine, and a pair of disks having aligned notches for feeding glass blanks from said magazine to the conveyor, said disks being adjustable relative to each other to adapt the same to the feeding of blanks of different diameters.

15. In a machine of the class described, means for holding a glass blank, means for moving said holding means along a definite path, and means for dividing the glass blank into a plurality of sections, said last mentioned means including a rotating disk, an arm on one end of which said disk is rotatably mounted, a pivotal support for the other end of said arm, a drive pulley for said disk having its axis coaxial with the pivotal axis of said arm, and a second arm counter-balancing the first mentioned arm and arranged to continuously urge the disk into engagement with the blank carried by the holding means.

16. In a machine of the class described, a plurality of devices each adapted to hold a glass blank, a support for all of said devices, means for moving said support to move said holding devices along a definite path, and means for severing each glass blank carried by one of said devices into two sections, said last mentioned means including a member mounted for movement and arranged to strike the glass blank, and means including cams carried by said support for moving said member.

17. In a machine of the class described, a pair of aligned chucks adapted to grip the ends of a glass blank, a pair of supports carrying said chucks, means for moving said supports to cause said chucks to travel along a definite path, rails disposed between the chucks for a portion of the path of travel thereof defining a path parallel with the path of movement of the chucks, and means adapted to convey a glass blank from a point remote from said chucks onto said rails and to move the blank along said rails whereby the blank is brought into alignment with the chucks during a portion of the movement thereof.

18. In a machine of the class described, a member mounted for rotation, a series of chucks carried by said member, each of said chucks being adapted to hold a glass blank, means for rotating said member to move said chucks along a definite path, and means for severing each glass blank carried by one of said chucks into two sections, said last mentioned means including a hammerlike member mounted for movement and arranged to strike the glass blank, and means including cams carried by said rotatable member for moving said hammerlike member.

19. In a machine of the class described, a chuck for holding a glass blank, means for moving said blank along a definite path, a magazine for receiving a plurality of glass blanks, a conveyor having lugs adapted to engage the glass blanks and move the same into alignment with the said chuck, means including a notched disc for feeding glass blanks from the magazine to the conveyor, means for adjusting the said disc to properly locate the notches therein with reference to the lugs on the conveyor, and means for adjusting the conveyor to properly locate the lugs thereon with reference to the said chuck.

TRADESMENS BANK AND
                TRUST COMPANY,
By ALBERT C. STRANG,
            *Trust Officer.*
*Administrator of the Estate of Hans N. Halversen, Deceased.*